United States Patent
Jiang et al.

(10) Patent No.: US 11,308,493 B2
(45) Date of Patent: *Apr. 19, 2022

(54) METHOD AND SYSTEM USING ILLUSTRATION TO CONDUCT AN EXPEDITED ELECTRONIC TRANSACTION

(71) Applicant: VISA INTERNATIONAL SERVICE ASSOCIATION, San Francisco, CA (US)

(72) Inventors: Chunxi Jiang, San Francisco, CA (US); Clint Florez, Bellevue, WA (US); Peng Zhao, San Francisco, CA (US); Kevin Carvalho, San Francisco, CA (US); Sang Wook Lee, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 16/351,142

(22) Filed: Mar. 12, 2019

(65) Prior Publication Data

US 2019/0205879 A1 Jul. 4, 2019

Related U.S. Application Data

(63) Continuation of application No. 14/921,692, filed on Oct. 23, 2015, now Pat. No. 10,275,769.
(Continued)

(51) Int. Cl.
*G06Q 30/00* (2012.01)
*G06Q 20/40* (2012.01)
(Continued)

(52) U.S. Cl.
CPC ....... *G06Q 20/401* (2013.01); *G06Q 20/3276* (2013.01); *G06Q 20/409* (2013.01);
(Continued)

(58) Field of Classification Search
CPC ............ G06Q 30/0641; G06Q 20/401; G06Q 20/3276; G06Q 20/409; G06Q 20/42; G06Q 30/0601–0645; G06Q 30/08
(Continued)

(56) References Cited

U.S. PATENT DOCUMENTS 7,657,849 B2   2/2010   Chaudhri
8,046,721 B2   10/2011  Chaudhri
(Continued)

FOREIGN PATENT DOCUMENTS

CN   102687165 A   9/2012
CN   103546430 A   1/2014
(Continued)

OTHER PUBLICATIONS

Bhatnagar, Bob, Top 7 Ways to Customize the iPhone Unlock, Jun. 23, 2014, iphonefaq.org, accessed at [https://www.iphonefaq.org/archives/973596] (Year: 2014).*
(Continued)

*Primary Examiner* — Jeffrey A. Smith
*Assistant Examiner* — Lindsey B Smith
(74) *Attorney, Agent, or Firm* — Loeb & Loeb LLP

(57) ABSTRACT

A method to display an illustration to conduct an expedited electronic transaction is provided. Consumer identification information identifying a consumer is received. The consumer identification information is stored in association with a web browser of a consumer's device. A customized illustration is displayed based on the received consumer identification information on the consumer's device. A request is received for the expedited electronic transaction
(Continued)

by swiping the customized illustration across a portion of the display of the consumer's device. Transaction data sufficient to complete the electronic transaction is sent to the merchant based on the swipe of the customized illustration across display of the consumer's device.

20 Claims, 16 Drawing Sheets

Related U.S. Application Data

(60) Provisional application No. 62/067,884, filed on Oct. 23, 2014.

(51) Int. Cl.
*G06Q 20/32* (2012.01)
*G06Q 20/42* (2012.01)
*G06Q 30/06* (2012.01)

(52) U.S. Cl.
CPC ......... *G06Q 20/42* (2013.01); *G06Q 30/0601* (2013.01); *G06Q 30/0641* (2013.01)

(58) Field of Classification Search
USPC ...................................... 705/27.1, 26.1–27.2
See application file for complete search history.

(56) References Cited

U.S. PATENT DOCUMENTS

| | | | |
|---|---|---|---|
| D675,639 S | 2/2013 | Anzures | |
| 2002/0165971 A1* | 11/2002 | Baron | H04L 63/08 709/228 |
| 2009/0150551 A1 | 6/2009 | Pagan | |
| 2009/0241072 A1 | 9/2009 | Chaudhri | |
| 2013/0013499 A1* | 1/2013 | Kalgi | G06Q 20/34 705/41 |
| 2013/0024364 A1* | 1/2013 | Shrivastava | G06Q 20/38 705/39 |
| 2013/0085896 A1 | 4/2013 | Hartman | |
| 2014/0019322 A1* | 1/2014 | Streit | G06Q 40/02 705/35 |
| 2014/0040756 A1* | 2/2014 | Bukurak | G06F 3/017 715/741 |
| 2014/0283009 A1 | 9/2014 | Hsueh | |
| 2014/0283128 A1 | 9/2014 | Shepherd | |
| 2014/0344106 A1* | 11/2014 | Lee | G06Q 30/0641 705/26.8 |
| 2014/0359726 A1* | 12/2014 | Anson | G06F 21/31 726/5 |
| 2015/0339656 A1* | 11/2015 | Wilson | G06Q 20/385 705/44 |
| 2017/0249610 A1* | 8/2017 | Ferrer | G06F 21/105 |
| 2018/0032997 A1* | 2/2018 | Gordon | G06Q 30/0269 |

FOREIGN PATENT DOCUMENTS

| | | |
|---|---|---|
| CN | 103941988 A | 7/2014 |
| RU | 2482538 C1 | 4/2013 |

OTHER PUBLICATIONS

Russian Office Action (with English language translation) for Application No. 2017113114, dated May 8, 2019, 6 pages.
International Search Report and Written Opinion issued in corresponding PCT Application No. PCT/US15/57180 dated Jan. 1, 20161, 6 pages.
Visa Checkout. JavaScript Integration Guide (Oct. 7, 2014). Retrieved from https://www.authorize.net/content/dam/authorize/ docunnentsNisaCheckoutJavaScriptIntegrationGuide.pdf (Year: 2014), 54 pages.
Visa Checkout. Getting Started With Visa Checkout (Oct. 7, 2014). Retrieved from https://www.authorize.net/content/dam/ authorize/ documentsNisaCheckoutGettingStarted.pdf (Year: 2014), 19 pages.
Woodward, K. (Jul. 17, 2014). Visa Revamps Its Online Wallet, and Gives It a New Name: Visa Checkout. Retrieved from http://www. digitaltransactions.net/visa-revamps-its-online-wallet-and-gives-it-a-new-name-visa-checkout/ (Year: 2014) (3 pages).
Office Action dated Jul. 27, 2018 for U.S. Appl. No. 14/921,692 (pp. 1-27).
Notice of Allowance dated Dec. 12, 2018 for U.S. Appl. No. 14/921,692 (pp. 1-16).
Chinese Office Action for Application No. CN201580057376.9, dated Sep. 18, 2019, 9 pages.
Canadian Office Action for App. No. CA2,963,896, dated Oct. 12, 2021, 6 pages.

\* cited by examiner

A103

| Subtotal (1 item) | $59.95 |

Shipping

✓ 7-9 business days - FREE
Every Day ($50 min) - $0.00

3-5 business days - $7.00

2 business days - $17.00

1 business day - $22.00

| Subtotal Before Tax | $59.95 |

CHECKOUT > password    Checkout
            LOGO john***@*.com

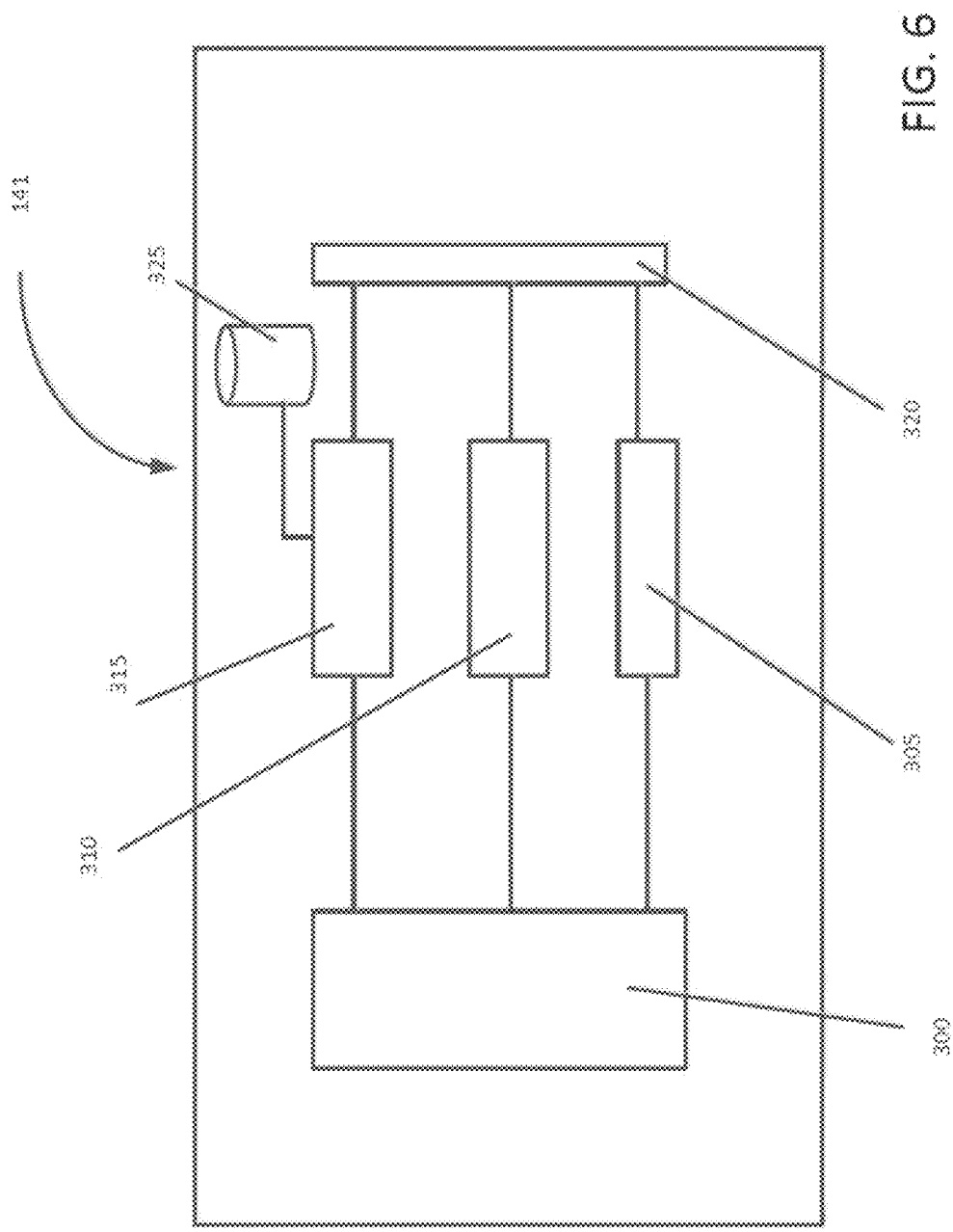

METHOD AND SYSTEM USING ILLUSTRATION TO CONDUCT AN EXPEDITED ELECTRONIC TRANSACTION

CROSS REFERENCE TO RELATED APPLICATIONS

This application is a continuation of, and claims priority to, U.S. application Ser. No. 14/921,692, filed Oct. 23, 2015, entitled "ILLUSTRATION TO CONDUCT AN EXPEDITED ELECTRONIC TRANSACTION", which claims the benefit of, and priority to, U.S. Provisional Appl. No. 62/067,884 filed Oct. 23, 2014, entitled "ILLUSTRATION TO CONDUCT AN EXPEDITED ELECTRONIC TRANSACTION", the entire content of which are incorporated herein by reference.

BACKGROUND

Electronic transactions typically require entry of multiple pieces of information. As the frequency of online transactions increase, the desire for streamlined methods of purchase increases. Many merchants currently offer goods and services available for purchase and distribution from websites. However, creating a display to receive necessary data to complete a transaction is cumbersome and inhibits use of alternate payment systems.

SUMMARY

Disclosed is a method and system of displaying an illustration to conduct an expedited electronic transaction. The method and system include receiving consumer identification information identifying a consumer wherein the consumer identification information is stored in association with a web browser of a device of a consumer. A customized illustration is displayed based on the received consumer identification information on a display of the device of the consumer. A request is received for an expedited electronic transaction by activating the customized illustration to move across a portion of the display of the device of the consumer. Password data is received in the space where the customized illustration moved across the portion of the display. This space is not traditionally available to receive inputs. The efficient use of this space on a display, rather than creating yet another input field or input screen, promotes more use of the expedited electronic transaction system. Transaction data sufficient to complete an electronic transaction is then communicated to a merchant.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIGS. 1A-1E are illustrations of a sample graphical user interface incorporating a graphical representation of a credit card in accordance with an embodiment of the subject technology.

FIG. 6 may be an illustration of a server type computing device which is physically configure according to the embodiments of the method' and FIGS. 7A-7C may be an illustration of selecting one payment device from a plurality of payment devices.

SPECIFICATION

Many consumers make regular online purchases across a variety of merchants and through a variety of websites. Many consumers also frequently make purchases with the same account and ship purchases to the same address on each of those various websites. A goal of the invention is to create a streamlined and efficient way to facilitate the consumer's online transactions without the need to re-enter the same transaction information, regardless of the merchant. This particular goal of the invention is of particular technical advantage in the maximization of screen space for small computing devices by creating a password box as part of a checkout activation button.

FIGS. 1A-1F are illustrations of a sample graphical user interface A103 incorporating a graphical representation of a payment device such as credit card A105 in accordance with an embodiment of the subject technology. The illustrations may be representative of graphical user interfaces A103 that would be used on mobile or tablet web browsers as a consumer is completing a purchase. After Consumer John has placed an item in his cart, he may encounter the screens A103 depicted in FIGS. 1A-1F, which may depict various screens.

Figure 1A:
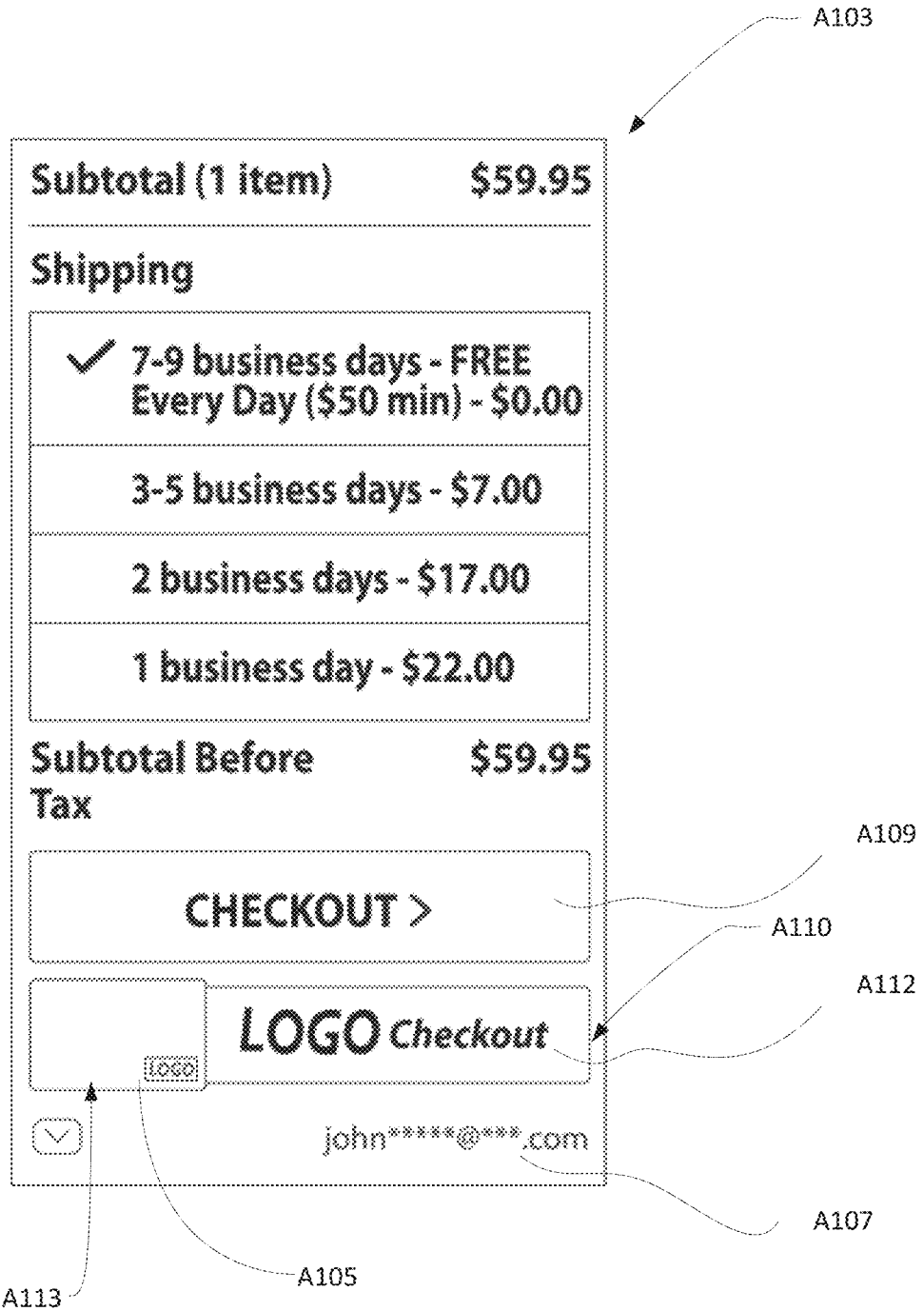

In FIG. 1A, a user may have an item in their shopping cart as shown in the subtotal. The user may be presented additional options such as shipping options. The use may then be presented payment options such as a traditional payment mechanism or an advanced expedited electronic transaction application such as Visa Checkout. If Consumer John would like to complete his transaction without using the expedited electronic transaction, he may select the topmost checkout button A109 and would be guided through several display screens in which he would be prompted to enter credit card, billing, and shipping information (not shown).

If the user desires to use the expedited electronic transaction system A110, the user may activate the expedited electronic transaction system. The activation may occur in a variety of ways. In one embodiment, the user may tap the expedited electronic transaction symbol A112 and a customized illustration A105 may then flow across the display. The movement of the customized illustration A105 may remove a logo or symbol from a first position A113 to a second position A115 for the expedited electronic transaction system if a logo or symbol is present and may reveal an entry field A117 to enter a password for the expedited electronic transaction system. In other embodiments, the movement may be further highlighted by the customized illustration A105 flashing, being highlighted, changing colors, etc.

In another embodiment, the expedited electronic transaction system may be activated by the user sliding the customized illustration A105 across the display 102. The movement may be thought of as a swipe, for example. As the customized illustration A105 moves across the display from a first position A113 to a second position A115, the customized illustration A105 may remove a logo or symbol for the expedited electronic transaction system if a logo or symbol is present and may reveal an entry field A117 to enter a password for the expedited electronic transaction system.

Logically, activation may occur in a variety of ways. As previously described, the activation action may be a tap, a swipe, a double tap, a prolonged hold on an input, etc. Of course, the activation action may be selected from a plurality of known actions by a user or may even be user defined. For example, the activation action may be a voice command created by the user, may be a movement of the phone by the user, may be a combination of inputs, etc.

In some embodiments, there may be a security aspect to the activation action. The activation action may be analyzing a thumbprint placed on an image sensor. Thus, the activation action may also result in the thumbprint being analyzed regarding whether the thumbprint is a recognized thumbprint. If the thumbprint is recognized, then the activation action may proceed and if the activation action is not recognized, the activation action may be repeated. Similarly, voice commands through a microphone may be used as an activation action and the voice received may be compared to known voices to verify the voice is known before proceeding with activation.

As mentioned previously, the activation action may be user definable. In one embodiment, a selection of actions may be predefined and a user may select an activity action from the predefined list. The predefined list may be device dependent. For example, some devices may not have a sufficient image sensors to read a thumbprint, etc. In other embodiments, the activation action may be more broad than a predefined list and a user may create their own activation action which may be a single action or a combination of actions.

The customized illustration may be a variety of relevant objects. In FIGS. 1A-1F, the customized illustration is illustrated as being in the form of a credit card. In some embodiments, the credit card may be a generic credit card. In other embodiments, the card may be a replica of a payment device or card that the user actually controls. In some embodiments, the card replica data may be stored in the mobile device such as with an electronic cookie. In other embodiments, the card may be a replica of one or more cards the user has added to the expedited electronic payment system. For example, if the user has a card that is sponsored by Green University, the displayed customized illustration may be a Green University credit card. Of course, the customized illustration A105 may take on many forms and may represent a variety of things including payment device such as debit cards, gift card, store credit card, loyalty cards, points card, a representation of an alternate currency such as Airline miles, bitcoins, rebates, etc.

In another aspect, the user may be able to select one of the customized illustrations A105 which may be payment devices cards associated with the expedited electronic payment system if there are more than payment device associated with a user. A user may have several payment devices attached to an expedited electronic transaction system. By activating the card by selecting a customized illustration A105, a pop-up additional window may appear in which a user may select one payment device out of a plurality of payment devices.

Figure 7C:
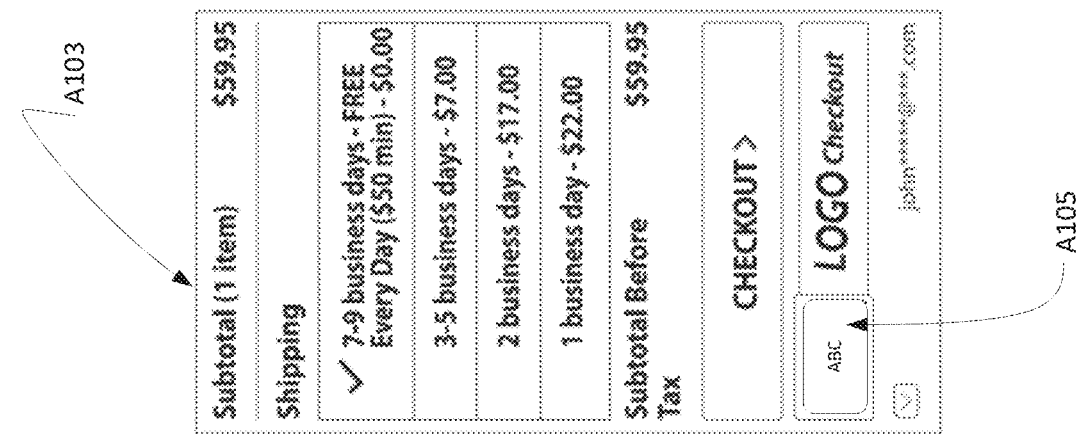
Figure 7B:
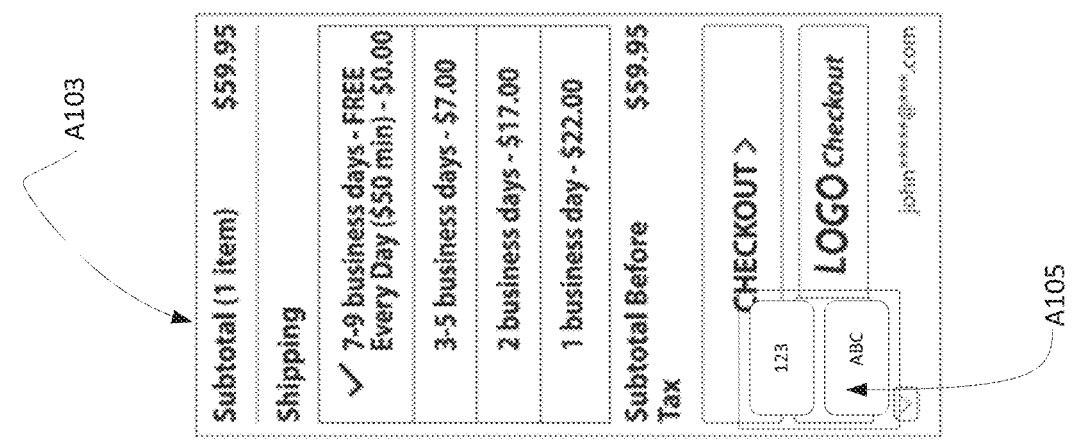
Figure 7A:
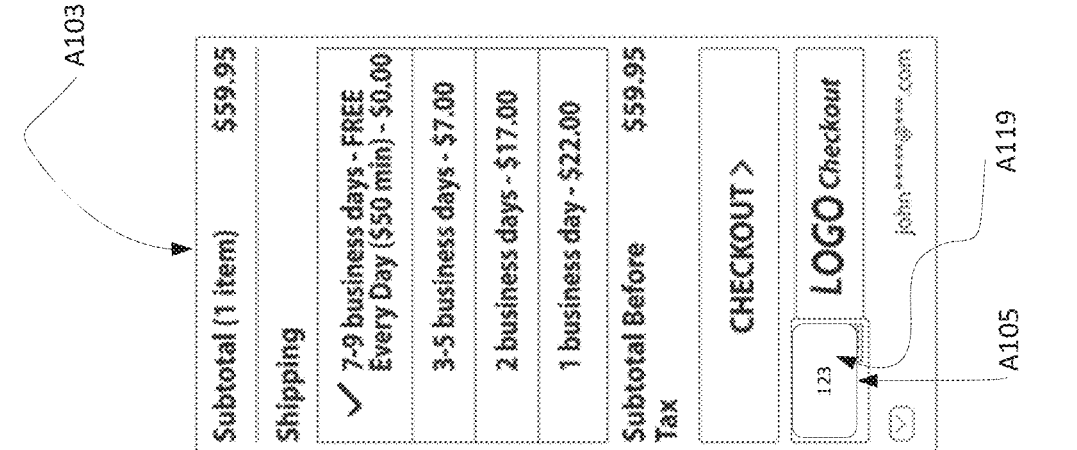

In another embodiment as illustrated in FIGS. 7A-7C, the user may swipe down on the activation space and may rotate through the plurality of customized illustrations A105 which may represent payment devices which may be displayed in the activation space. The user may be able to rotate through a plurality of payment devices and stop on the desired illustration. The rotation may be vertical, horizontal or in both direction.

In another embodiment, the user may tap the activation space A119 to index through a plurality of payment devices. For example, the user may hold the activation space A119 until the payment device indicates it is ready to be changed such as highlighting the payment device, outlining the payment device, greying the payment device, making the payment device blink, etc. Once the payment device related to the payment illustration A105 has being activated, tapping the payment device may allow it to index through a the plurality of payment devices which have been associated with the expedited electronic payment system. Of course, other manners of changing the payment device are known and are contemplated.

FIG. 1B may illustrate the customized illustration A105 flowing across the expedited electronic transaction system illustration. The movement of the customized illustration A105 may be the result of a swipe or from another activation action.

Figure 1C:
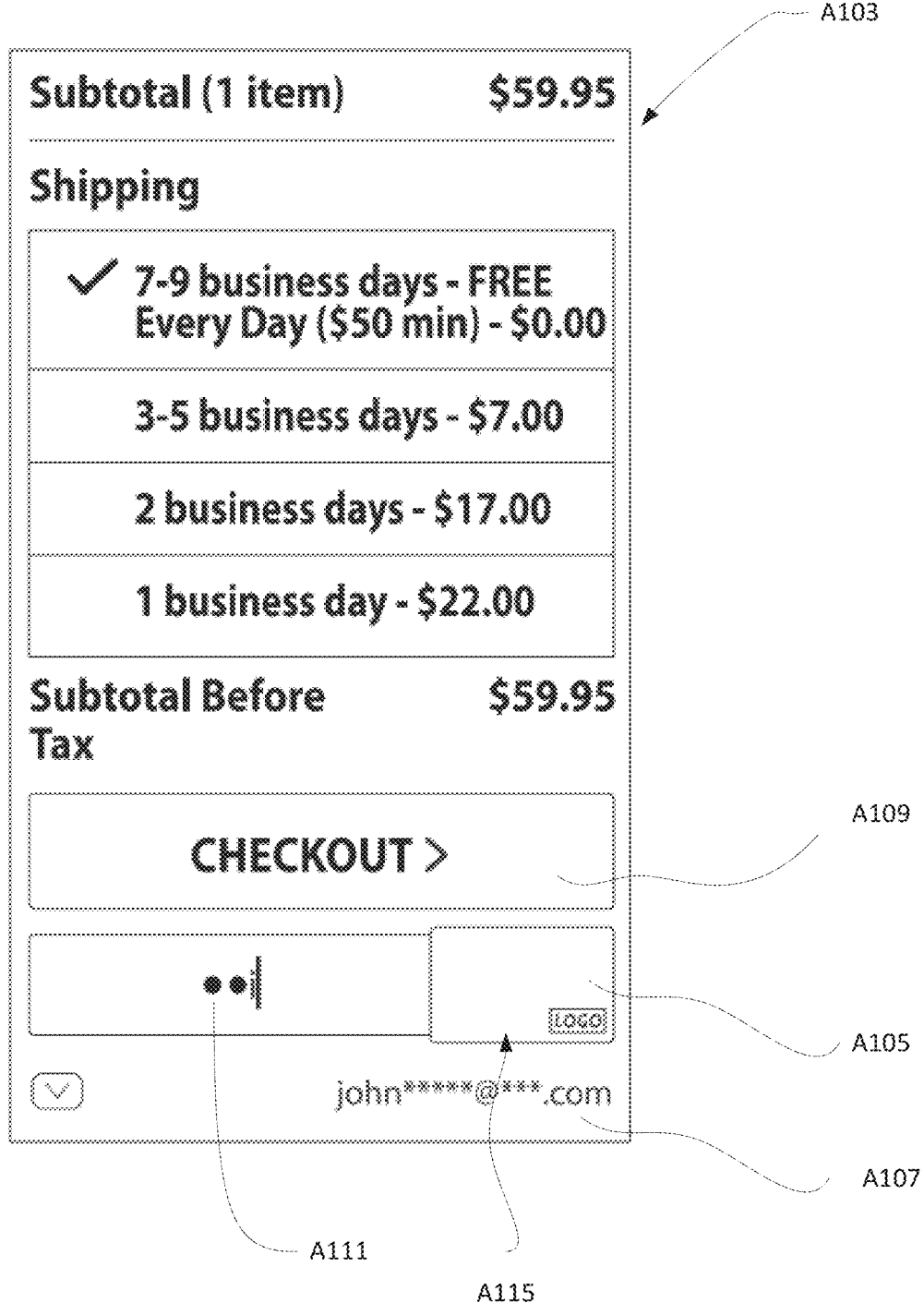
Figure 1D:
Figure 1E:

FIG. 1C may illustrate that the activation action has been completed and that a password or other activation sequence is being entered. The password may be obscured for security. FIG. 1D illustrates that the entire activation sequence has been received even though the code is obscured with darkened circles. It also illustrates the first position A113 (dashed) and the second position A115. FIG. 1E illustrates that the entire activation sequence has been received in the entry space A117 even though the code is obscured with asterisks. Of course, other manners of obscuring the entered passcodes are possible.

Figure 2A:
FIGS. 2A-F are illustrations of a sample graphical user interface of the subject technology in accordance with an embodiment of the subject technology.
Figure 2B:
Figure 2C:
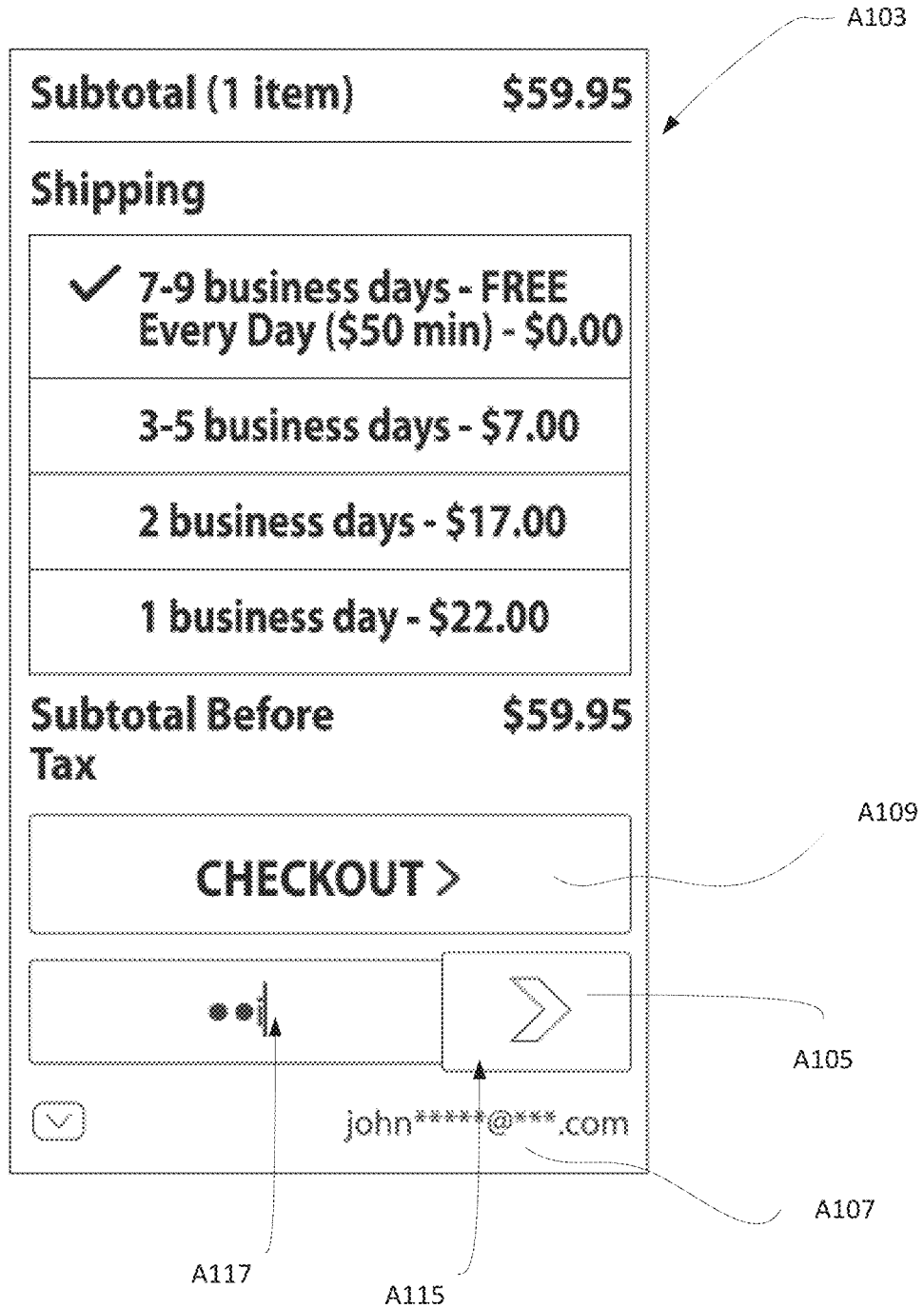
Figure 2D:
Figure 2E:
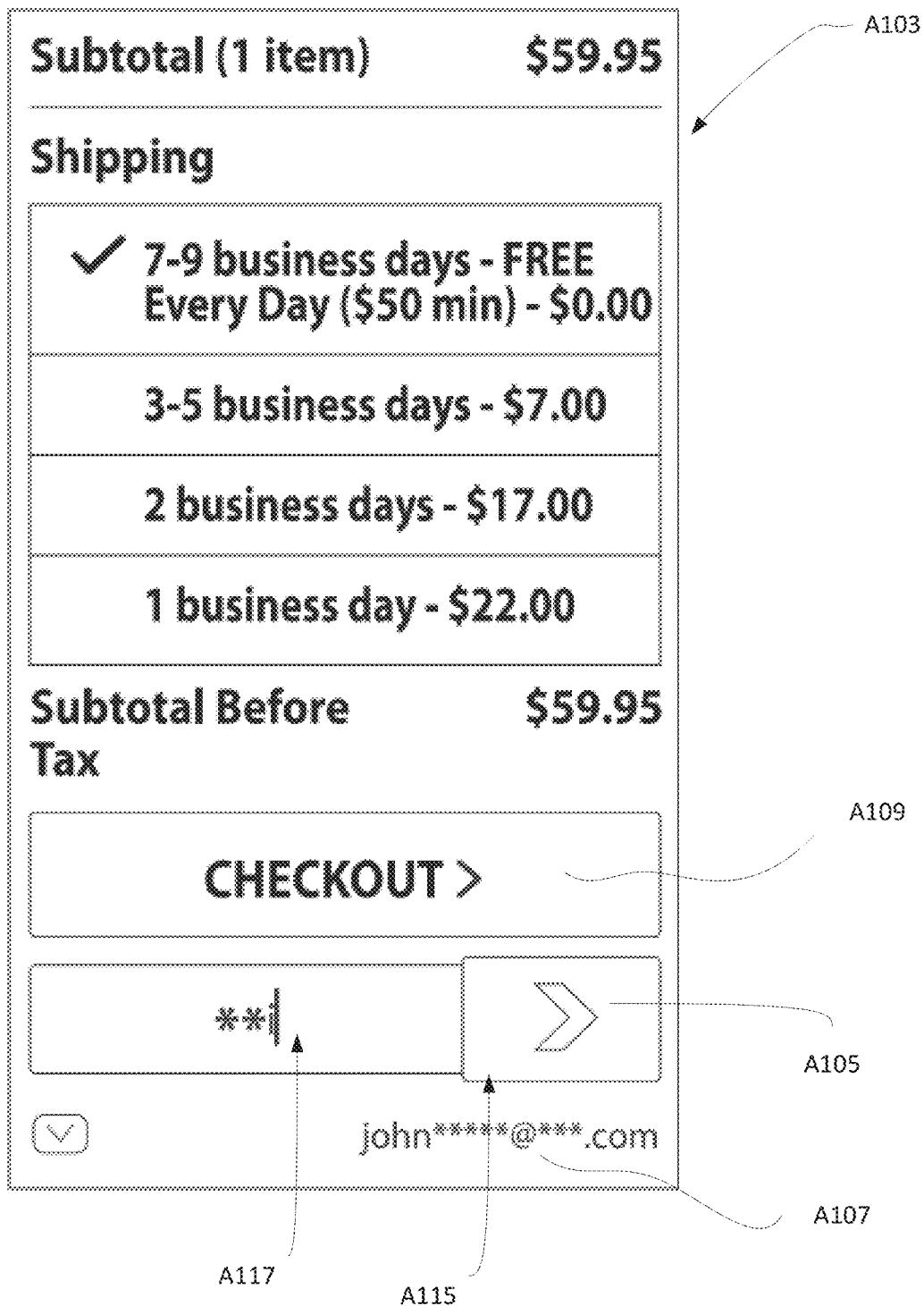
Figure 2F:
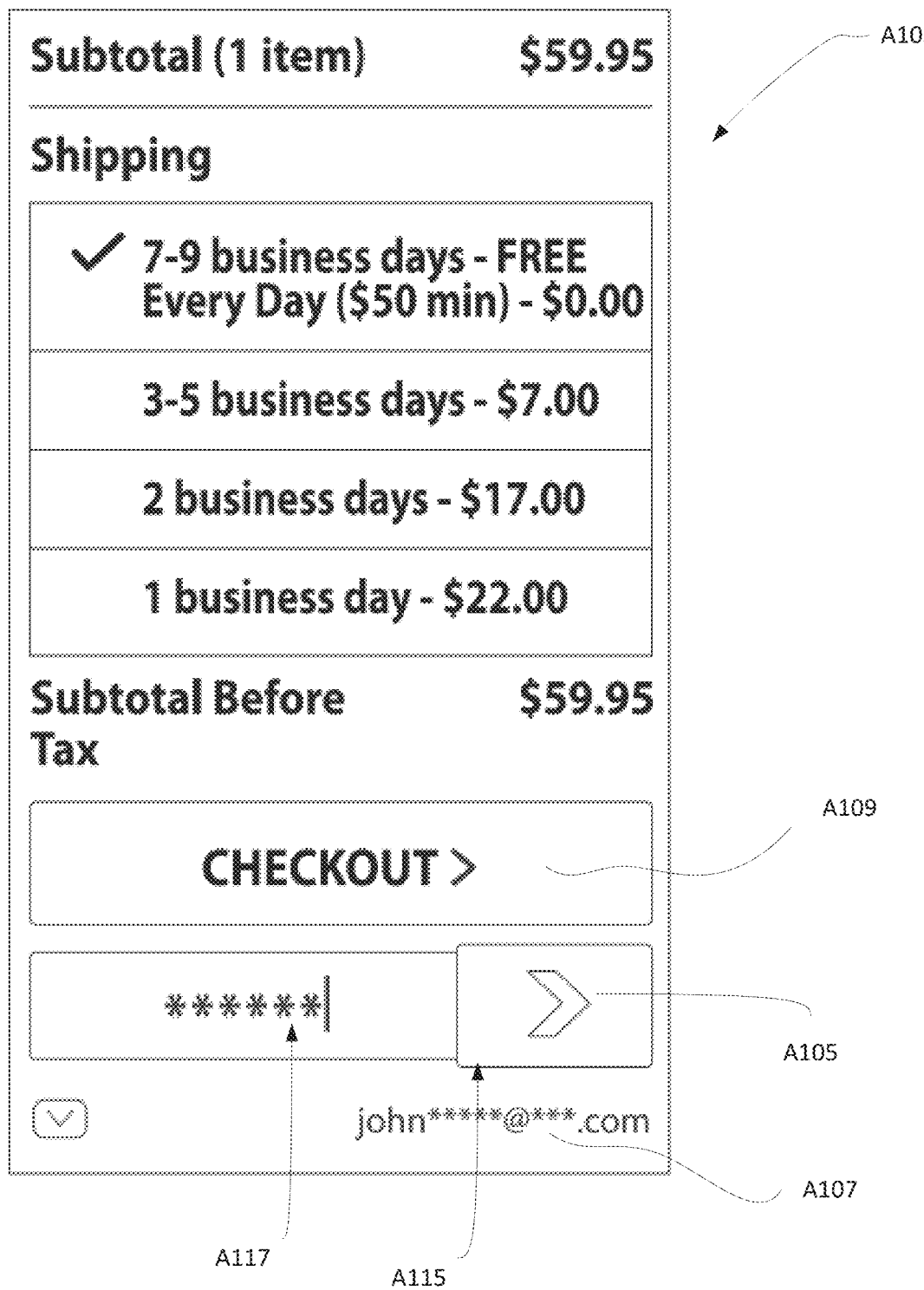

FIG. 2A may illustrate an embodiment where no representations of a payment device are available. In this case, a chevron is used inside the payment device. In FIG. 2B, the payment device with chevron flows across the display. In FIG. 2C, the payment device with chevron has moved fully across the expedited electronic transaction system display and an activation sequence is being entered. FIG. 2D illustrates where an activation sequence has been entered and is obscured by darkened circles. FIG. 2E illustrates an embodiments where an activation sequence is being entered and is obscured by asterisks and FIG. 2F illustrates where the activation code is almost completely entered but is occurred by asterisks.

There may be a variety of expedited electronic payment systems and the manner of activating them may vary. The technical challenge is how to enter a password in a payment illustration without forcing the user to enter an additional screen or creating a pop-up that dominates the clean design of the expedited electronic payment system. Past systems defeated the purpose of the expedited electronic payment system by forcing passwords in additional display screens, space wasting and distracting password entry fields or pop-ups. As a result, the expedited electronic payment system was not used as frequently as possible.

The additional displays or pop-ups may defeat the purpose of the expedited electronic payment system which may emphasize ease of payment. By accepting a password in the activation space, the clean and easy action of the electronic payment system may be maintained.

In some embodiments, the expedited electronic transaction system may be pre-populated with a sign on and a variety of payment devices and a password may be necessary to effectuate a transaction. The sign-on may be stored locally on the mobile computing device such as an electronic cookie or may be stored remotely. If the sign-on is known, it may appear in a sign-on space A107. In some embodiments, the sign-on may be partially obscured.

As an example, consumer John's payment identification which may be an email address A107 may be masked, and he may be prompted for his password to complete his expedited electronic transaction. For privacy purposes, as shown in FIGS. 1C-1F, password entry may be masked by dots, asterisks or other masking symbol A111.

Figure 3:
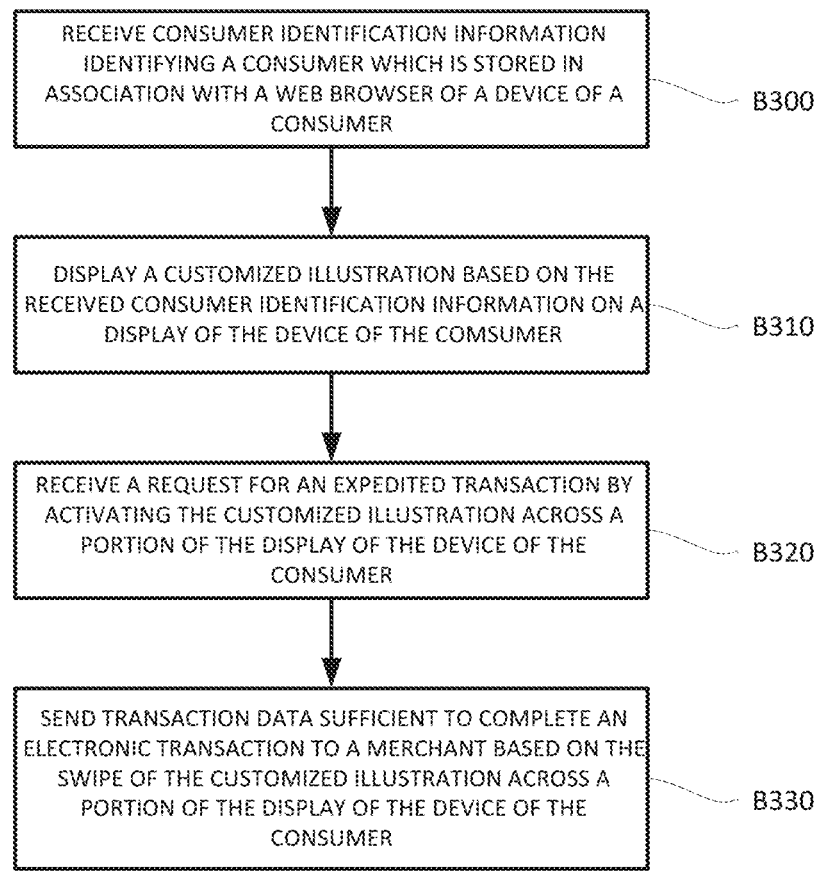
FIG. 3 is a flow diagram of a method in accordance with the subject technology.

FIGS. 2A-F are illustrations of a sample graphical user interface of the subject technology in accordance with an embodiment of the subject technology. The screens may or may not detect inactive cookies which may represent card art. If card art is not identified or associated with the user, a generic or stylized checkout button may be depicted as shown in FIGS. 2A-F. In this situation, if data regarding the various payment devices is not available, a generic payment FIG. 3 is a flow diagram of a method in accordance with the subject technology. At block B300 consumer identification information is received identifying a consumer, wherein the consumer identification information is stored in association with a web browser of a device of a consumer. The consumer may be identified based on a stored cookie of the web browser, i.e., the consumer identification information may be stored as a cookie of the web browser. The consumer identification information may be user account information associating the consumer with a user account for an expedited electronic transaction system that may be part of a larger transaction account system. The consumer may be able to store information associated with multiple accounts, credit cards, debit cards, gift cards, shipping addresses, billing addresses, expiration dates, CVV, CVV2s, and any other necessary information to complete a transaction. The consumer may be able to designate a default account, shipping information, billing address and other information such that upon requesting an expedited electronic transaction, any and all necessary transaction information is sent in order to facilitate a purchase. All sensitive consumer account information may be stored on remote, secure servers, while card-art and the user's e-mail address are stored in the consumer's browser cookie.

At block B310, a customized illustration based on the received consumer identification is displayed based on the received consumer identification information on a display of the device of the consumer. The display elements may be further dictated based on the status of the cookie. For example, the status of the cookie may be an active or inactive status that may be based on the duration of time since the consumer has last use the expedited electronic transaction system. If the status of the cookie is an active status, the customized illustration may correspond to card art associated with a physical card of the consumer. For example, if the consumer has a customized physical credit card associated with the expedited electronic transaction system, then the card art may be correspond to the customized physical credit card. The display may further include an unmasked user email address of the consumer associated with the expedited electronic transaction system, an unmasked delivery address and the last four digits of the Primary Account Number (PAN) of the consumer associated with the consumer. The PAN may additionally be associated with the card art appearing on the display. Although the consumer's user account for the expedited electronic transaction system may have a password associated with it, the user may not need to enter a password if the cookie is identified by the system and determined to have an active status.

If the status of the cookie is an inactive status, the customized illustration may correspond to card art associated with a physical card of the consumer but may further include a requirement that the consumer enter a password associated with the consumer's user account for the expedited electronic transaction system. Other elements of the display when the cookie is an inactive status may include a masked user email, a masked delivery address and the last four digits of the PAN of the consumer.

At block B320, a request for an expedited transaction is received by activating the customized illustration A105 across a portion of the display of the device from a first position A113 to a second position A115. If a cookie is in an inactive status, the swiping of the customized illustration may prompt the consumer to enter the consumer's user password associated with the expedited electronic transaction system in the entry space A117. Swiping may take many forms and may even be defined specifically for a user. In one embodiment, a swipe starts from a first point of contact on a touch sensitive display such as a capacitive display. The point of contact may then proceed through a designated swipe area to a point of completion. If the point of contact does not complete to the point of completion, the swipe action may stop or reset. Similarly, if the swipe starts but then reverses, the swipe action may stop or reset. Of course, a user may be able to define his own swipe zone, point of completion, etc., which may even take on non-linear paths and forms. Upon correct entry of the consumer's password, the transaction then continues. The consumer swipes across the display, which initiates the transaction with the merchant. At B330, transaction data sufficient to complete an electronic transaction is sent to a merchant based on the swipe of the customized illustration across a portion of the display of the device of the consumer.

The expedited electronic transaction system authenticates the user, and if successful (including the approval of the transaction), payment data is generated, then further display illustrations are generated which provide details regarding the completed order. The transaction may flow through a payment network which may be physically configured to execute review and approve transactions. The payment network may employ tokens to enable the transaction which may include short term personal identification numbers which are known only to the payment network or the payment instrument provider.

Figure 4:
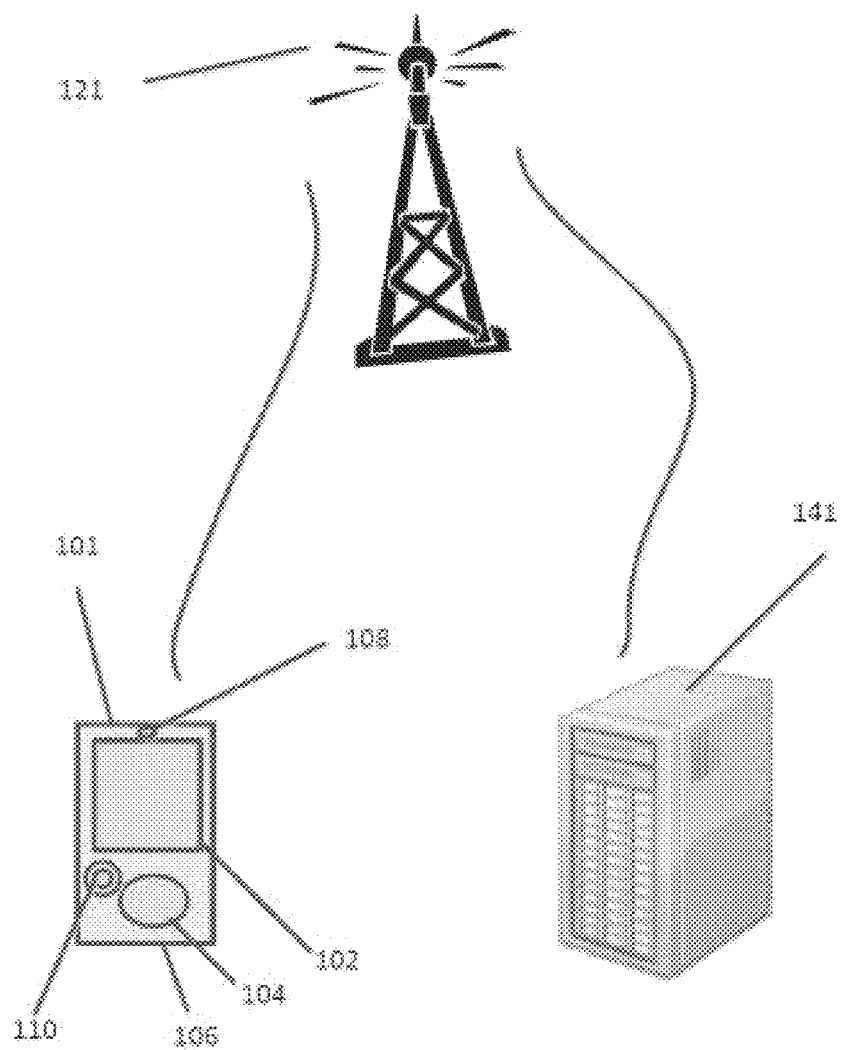
FIG. 4 is an illustration of a sample computing environment physically configured to execute the embodiments of the method.
Figure 5:
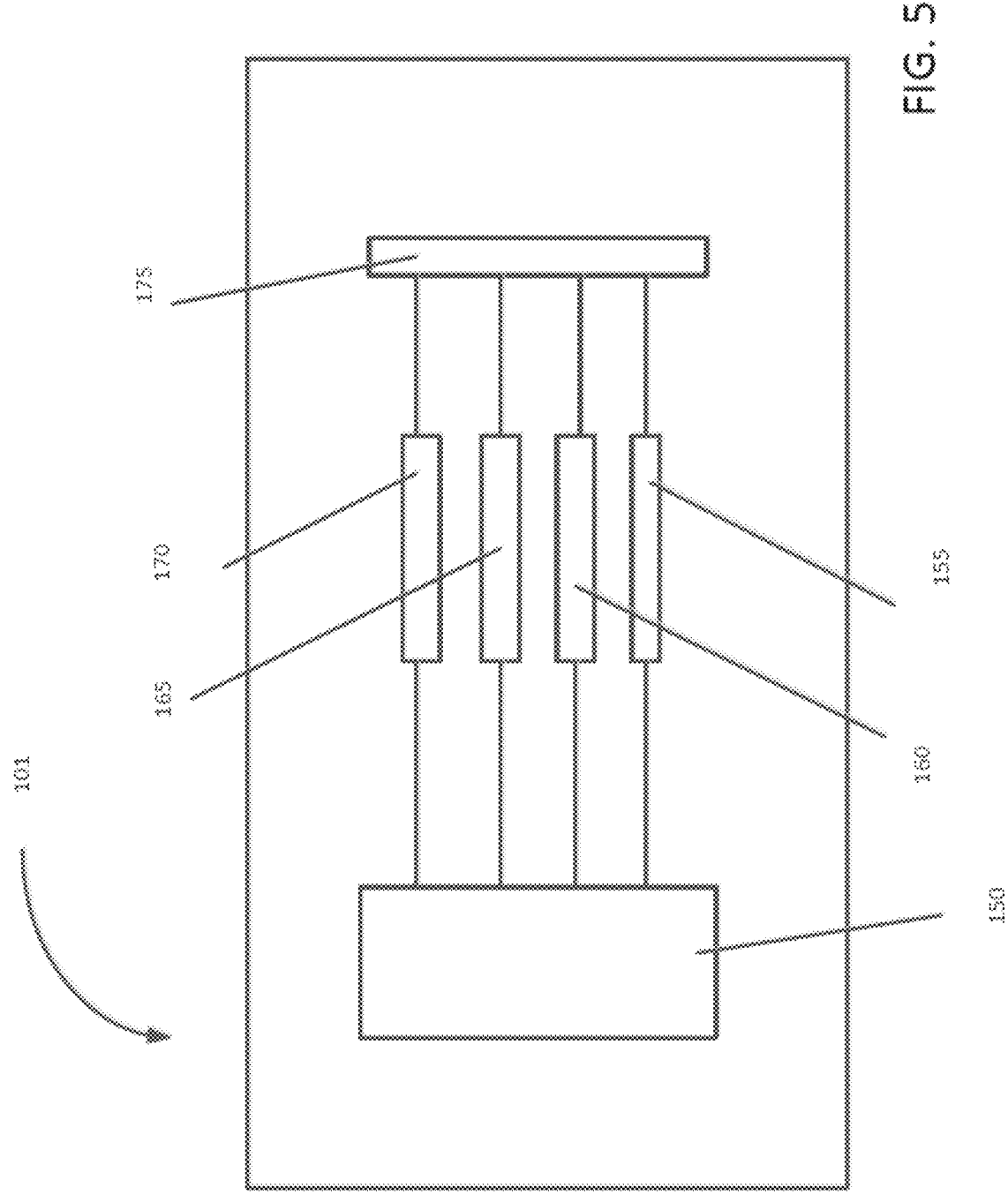
FIG. 5 is an illustration of a portable computing device which is physically configured according to embodiments of the method.

FIG. 4 may be a high level illustration of some of the elements in a sample computing system that may be physically configured to execute the various embodiments of the method. The computing system may be a dedicated computing device 141, a dedicated portable computing device 101, an application on the computing device 141, an application on the portable computing device 101 or a combination of all of these. FIG. 5 may be a high level illustration of a portable computing device 101 communicating with a remote computing device 141 through a communication device 121 but the application may be stored and accessed in a variety of ways. In addition, the application may be obtained in a variety of ways such as from an app store, from a web site, from a store WiFi system, etc. There may be various versions of the application to take advantage of the benefits of different computing devices, different computing languages and different API platforms.

The system solves several technological problems. First, users often are wary of entering sensitive data into a mobile electronic device. By creating a graphical user interface that operates in an unexpected and more useful manner, more people may use the expedited electronic payment system. Also, by allowing users to enter information in a space which was previously unused, it saves users from having to proceed to another screen and wait for another screen to load. Further, by allowing users to select a payment device from a plurality of payment devices on a first screen, the screen acts in an unexpected way the improves the functionality of the computing system.

As illustrated in FIG. 4, payment transaction data may be received by the system in a variety of ways. In some embodiments, the portable computing devices 101 with near field communication (NFC) capability may be used to communicate the payments transaction data to remote computing devices 141. In yet additional embodiments, the payment transaction data may be typed in by a user, such as a user of a personal computer. As can be understood, the relevant transaction data may be entered manually or may be communicated in an electronic fashion, such as through a communication device 121 and using WiFi, Ethernet, NFC, infrared, high frequency communication systems or any other electronic communication format. It should be noted that the actual account information such as the 16 digit credit card number do not necessarily have to be communicated. A code or token may be used and the code may be used to access the actual payment transaction data which may be stored locally, such as in a portable computing device 101 or may be stored remotely, such as in a cloud computing environment 141. Logically, the code may be encrypted and the code may also be used as part of an encryption key.

In one embodiment, a portable computing device 101 may be a device that operates using a portable power source 155 such as a battery (FIG. 5). Referring to FIG. 4, the portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 110 to communicate sounds.

The portable computing device 101 may be able to communicate with a computing device 141 or a plurality of computing devices 141 that make up a cloud of computing devices 111 through a communication device 121. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication device or network of devices 121 such as cellular service, through the Internet, through a private network, through Bluetooth, through near field communications, etc. FIG. 5 may be a simplified illustration of the physical elements that make up a portable computing device 101 and FIG. 6 may be a simplified illustration of the physical elements that make up a server type computing device 141.

Referring to FIG. 5, a sample portable computing device 101 may be physically configured according to a method to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination. The portable computing device 101 may act as the display 102 or may be a part of the display 102.

The physical elements that make up the remote computing device 141 may be further illustrated in FIG. 6. At a high level, the computing device 141 may include a digital storage such as a magnetic disk, an optical disk, flash storage, non-volatile storage, etc. Structured data may be stored in the digital storage such as in a database. The server 141 may have a processor 300 that is physically configured according to computer executable instructions. It may also have a sound and video module 305 which assists in displaying video and sound and may turn off when not in use to conserve power and battery life. The server 141 may also have volatile memory 310 and non-volatile memory 315.

The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the server 141 and the number and types of computing devices 141 is limited only by the imagination.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer," as used in this disclosure, means any machine, device, circuit, component, or module, or any system of machines, devices, circuits, components, modules, etc., which are capable of manipulating data according to one or more instructions, such as, for example, without limitation, a processor, a microprocessor, a central processing unit, a general purpose computer, a super computer, a personal computer, a laptop computer, a palmtop computer, a tablet computer, a smart phone, a notebook computer, a desktop computer, a workstation computer, a server, etc., or an array of processors, microprocessors, central processing units, general purpose computers, super computers, personal computers, laptop computers, palmtop computers, notebook computers, desktop computers, workstation computers, servers, etc.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any of its computers, may also be used as a workstation.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, OG, IG, 2G, 3G or 4G cellular standards, Bluetooth, and the like.

A "network," as used in this disclosure means, but is not limited to, for example, at least one of a local area network (LAN), a wide area network (WAN), a storage area network (SAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

An "individual" or "consumer" as used in this disclosure means, but is not limited to, for example, a human, artificially intelligent software (e.g., fuzzy logic, neural networks, or the like), a fully automated, robotic entity, or a plurality of fully automated, networked, robotic entities.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium," as used in this disclosure, means any medium that participates in providing data (for example, instructions) which may be read by a computer. In some examples the computer-readable medium may be non-transitory. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., tens of, hundreds of, or thousands of) memory caches on multiple (e.g., tens of, hundreds of, or thousands of) computers.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, OG, I G, 2G, 3G or 4G cellular standards, Bluetooth, or the like.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, may comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Still further, the figures depict preferred embodiments of a system for purposes of illustration only. One skilled in the art will readily recognize from the foregoing discussion that alternative embodiments of the structures and methods illustrated herein may be employed without departing from the principles described herein. Thus, upon reading this disclosure, those of skill in the art will appreciate still additional alternative structural and functional designs for a system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims While the disclosure has been described in terms of exemplary embodiments, those skilled in the art will recognize that the disclosure can be practiced with modifications that fall within the spirit and scope of the appended claims. These examples given above are merely illustrative and are not meant to be an exhaustive list of all possible designs, embodiments, applications or modification of the disclosure.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A processor executed method to conduct an expedited electronic transaction, the method comprising:
    receiving consumer identification information identifying a consumer at a processor, wherein the consumer identification information is stored in association with a web browser of a device of the consumer;
    displaying, via the processor, a customized illustration based on the received consumer identification information, wherein the customized illustration is a component of a checkout activation button displayed on a portion of a display of the device of the consumer;
    receiving, via the processor, a request for an expedited electronic transaction by activating the customized illustration;
    displaying, via the processor, the customized illustration in a movement from a first position on the display of the device of the consumer to a second position on the display of the consumer, the movement defining an entry portion between the first position and the second position, wherein the entry portion is disposed adjacent to the customized illustration; and receiving, via the processor, password information from the consumer in the entry portion.

2. The method of claim 1, wherein the consumer identification information is stored as a cookie of the web browser.

3. The method of claim 2, wherein the consumer identification information is identified based on a status of the cookie.

4. The method of claim 3, wherein the status of the cookie is an active status and the customized illustration corresponds to card art associated with a physical card of the consumer.

5. The method of claim 3, wherein the status of the cookie is an inactive status and the customized illustration corresponds to card art associated with a physical card of the consumer, further comprising:

displaying an indicator requesting the entry of a password in the entry portion; and receiving password information from the consumer via the display of the device adjacent to the customized illustration.

6. The method of claim 4, further comprising:

displaying additional customer identification information in a portion of the display of the device of the consumer;

wherein the additional customer identification information further includes an unmasked user email, an unmasked delivery address, and the last four digits of a primary account number of the consumer in a portion of the display of the device of the consumer.

7. The method of claim 5, wherein the inactive status of the cookie is based on a duration of time since the last request for an expedited electronic transaction by the consumer.

8. The method of claim 5, further comprising:

displaying additional customer identification information in a portion of the display of the device of the consumer;

wherein the additional customer identification information further includes a masked user email, a masked delivery address and the last four digits of a primary account number of the consumer in a portion of the display of the device of the consumer.

9. The method of claim 1, further comprising selecting one customized illustration from a plurality of customized illustrations where each customized illustration represents a separate payment device.

10. The method of claim 9, wherein the customized illustration is an illustration of a payment device related to the consumer.

11. The method of claim 10, wherein the payment device is at least one of a credit card, a debit card, a gift card, a branded store card, and a loyalty card.

12. The method of claim 9, wherein the customized illustration rotates through a plurality of payment devices associated with an expedited electronic transaction system.

13. The method of claim 9, wherein the customized illustration is selected from an initial payments display window.

14. The method of claim 1, wherein the entry portion is displayed on an initial payments display window.

15. The method of claim 1, further comprising communicating transaction data sufficient to complete an electronic transaction to a merchant based on the activation of the customized illustration across a portion of the display of the device of the consumer.

16. A system for displaying an illustration to conduct an expedited electronic transaction, the system comprising:

a processor, and a memory in communication with the processor;

the processor being physically configured to:

receive consumer identification information identifying a consumer at a processor, wherein the consumer identification information is stored in association with a web browser of a device of the consumer;

display a customized illustration based on the received consumer identification information, wherein the customized illustration is a component of a checkout activation button displayed on a display of the device of the consumer;

receive a request for an expedited electronic transaction by activating the customized illustration;

display the customized illustration in a movement from a first position on the display of the device of the consumer to a second position on the display of the device of the consumer, the movement defining an entry portion between the first position and the second position, wherein the entry portion is disposed adjacent to the customized illustration; and receive password information from the consumer in the entry portion.

17. The system of claim 16, the processor being configured to select one customized illustration from a plurality of customized illustrations where each customized illustration represents a separate payment device.

18. The system of claim 16, wherein the customized illustration is an illustration of a payment device related to the consumer.

19. The system of claim 16, wherein the customized illustration rotates through a plurality of payment devices associated with an expedited electronic transaction system.

20. The system of claim 16, wherein the customized illustration is selected from an initial payments display window.

* * * * *